US009007181B2

(12) United States Patent
Alicot et al.

(10) Patent No.: US 9,007,181 B2
(45) Date of Patent: Apr. 14, 2015

(54) METHOD AND SYSTEM FOR DISCOVERY AND TRANSPARENT STATUS REPORTING FOR SENSOR NETWORKS

(75) Inventors: Jorge F. Alicot, Davie, FL (US); Timothy J. Relihan, Lake Worth, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 724 days.

(21) Appl. No.: 12/684,402

(22) Filed: Jan. 8, 2010

(65) Prior Publication Data

US 2011/0169612 A1 Jul. 14, 2011

(51) Int. Cl.
*H04Q 5/22* (2006.01)
*G08B 13/24* (2006.01)
*G06K 7/10* (2006.01)

(52) U.S. Cl.
CPC ........ *G08B 13/2462* (2013.01); *G06K 7/10009* (2013.01)

(58) Field of Classification Search
CPC ..... G05D 23/19; G06K 7/01; G06K 19/0701; G06K 7/0008; G06K 7/10009; G06K 19/0723; G06K 19/07749; G06K 7/10297; G06K 7/10366; G06K 19/0717; G06K 17/0022; G06K 2017/0045; G06K 7/10128; G06K 7/10217; G06K 19/0705; G06K 19/0715
USPC ............. 340/572.1, 539.1, 539.3, 506, 568.1, 340/3.51, 539.26; 700/28, 286, 204, 205; 370/232; 709/206, 207
See application file for complete search history.

(56) References Cited

U.S. PATENT DOCUMENTS

| 5,039,980 | A | * | 8/1991 | Aggers et al. ................. 340/506 |
| 5,090,012 | A | * | 2/1992 | Kajiyama et al. ............. 370/449 |
| 5,361,985 | A | * | 11/1994 | Rein et al. ..................... 236/49.3 |
| 5,920,257 | A | * | 7/1999 | Commerford ................ 340/506 |
| 5,949,799 | A | * | 9/1999 | Grivna et al. ................. 714/749 |
| 6,150,955 | A | * | 11/2000 | Tracy et al. .............. 340/870.02 |
| 6,173,207 | B1 | * | 1/2001 | Eidson ............................ 700/14 |
| 6,182,130 | B1 | * | 1/2001 | Dolin et al. ................... 709/221 |
| 6,452,946 | B1 | * | 9/2002 | Manzardo ..................... 370/487 |

(Continued)

FOREIGN PATENT DOCUMENTS

WO 2007149736 A2 12/2007

OTHER PUBLICATIONS

International Search Report and Written Opinion dated Apr. 27, 2011 for International Application No. PCT/US2010/003065, International Filing Date: Dec. 1, 2010 consisting of 10-pages.

*Primary Examiner* — Jennifer Mehmood
*Assistant Examiner* — Rufus Point
(74) *Attorney, Agent, or Firm* — Alan M. Weisberg; Christopher & Weisberg, P.A.

(57) ABSTRACT

A system and method for monitoring the status of wireless node devices in a network. A network controller polls one or more sensor devices for status information. The sensor devices are in communication with at least one wireless node device. More than one sensor device may be associated with a single wireless node device. The wireless node device appends its own status information to the transmission frame of the sensor device's response message, and the transmission frame, containing the address and status information for both the sensor device and the wireless node device, is transmitted to the network controller. The inclusion of the wireless node device address and status information is done without the knowledge of the sensor device.

19 Claims, 4 Drawing Sheets

(56) References Cited

U.S. PATENT DOCUMENTS

| | | | |
|---|---|---|---|
| 6,801,524 B2 * | 10/2004 | Eteminan | 370/352 |
| 6,826,607 B1 * | 11/2004 | Gelvin et al. | 709/224 |
| 6,859,831 B1 * | 2/2005 | Gelvin et al. | 709/224 |
| 7,058,481 B2 * | 6/2006 | Jiang et al. | 700/286 |
| 7,119,692 B2 * | 10/2006 | Lieffort et al. | 340/572.4 |
| 7,283,045 B1 * | 10/2007 | Manz | 340/506 |
| 7,304,976 B2 * | 12/2007 | Mao et al. | 370/338 |
| 7,378,962 B2 * | 5/2008 | Odenwald et al. | 340/539.22 |
| 7,398,164 B2 * | 7/2008 | Ogushi et al. | 702/42 |
| 7,436,789 B2 * | 10/2008 | Caliskan et al. | 370/310.1 |
| 7,536,255 B2 * | 5/2009 | Otsuki et al. | 701/454 |
| 7,564,405 B2 * | 7/2009 | Durst et al. | 342/357.55 |
| 7,584,076 B2 * | 9/2009 | Gronauer et al. | 702/188 |
| 7,648,070 B2 * | 1/2010 | Droms et al. | 235/451 |
| 7,660,860 B2 * | 2/2010 | Yoon et al. | 709/206 |
| 7,675,867 B1 * | 3/2010 | Mraz et al. | 370/254 |
| 7,683,761 B2 * | 3/2010 | Burghard et al. | 340/10.2 |
| 7,689,295 B2 * | 3/2010 | Strole | 700/25 |
| 7,706,906 B2 * | 4/2010 | Ara et al. | 700/111 |
| 7,769,848 B2 * | 8/2010 | Choy et al. | 709/224 |
| 7,848,905 B2 * | 12/2010 | Troxler et al. | 702/187 |
| 7,885,251 B2 * | 2/2011 | Kim et al. | 370/350 |
| 7,904,052 B2 * | 3/2011 | Moriwaki | 455/343.4 |
| 7,920,067 B2 * | 4/2011 | Durtschi et al. | 340/605 |
| 7,937,595 B1 * | 5/2011 | Kumar et al. | 713/192 |
| 7,953,809 B2 * | 5/2011 | Lau et al. | 709/206 |
| 7,969,159 B2 * | 6/2011 | Curt et al. | 324/539 |
| 7,982,603 B2 * | 7/2011 | Moriwaki et al. | 340/539.22 |
| 7,994,911 B2 * | 8/2011 | Mercier et al. | 340/541 |
| 8,085,686 B2 * | 12/2011 | Thubert et al. | 370/254 |
| 8,090,855 B2 * | 1/2012 | Sethi et al. | 709/229 |
| 8,132,225 B2 * | 3/2012 | Chand et al. | 726/1 |
| 8,136,159 B2 * | 3/2012 | Koo et al. | 726/23 |
| 8,159,945 B2 * | 4/2012 | Muro et al. | 370/232 |
| 8,223,766 B2 * | 7/2012 | Matsumoto et al. | 370/390 |
| 8,275,313 B1 * | 9/2012 | Myers et al. | 455/41.2 |
| 8,427,338 B2 * | 4/2013 | Abad et al. | 340/870.07 |
| 2005/0052282 A1 * | 3/2005 | Rodgers et al. | 340/572.1 |
| 2005/0078672 A1 * | 4/2005 | Caliskan et al. | 370/389 |
| 2005/0253714 A1 | 11/2005 | Stephens | |
| 2005/0253722 A1 | 11/2005 | Droms et al. | |
| 2005/0264429 A1 * | 12/2005 | Hermary et al. | 340/870.06 |
| 2006/0062154 A1 * | 3/2006 | Choy et al. | 370/242 |
| 2006/0208892 A1 | 9/2006 | Ehrman et al. | |
| 2008/0031139 A1 * | 2/2008 | Muro et al. | 370/237 |
| 2008/0232334 A1 * | 9/2008 | Das et al. | 370/337 |
| 2009/0027061 A1 * | 1/2009 | Curt et al. | 324/539 |
| 2009/0085769 A1 * | 4/2009 | Thubert et al. | 340/870.07 |
| 2009/0133122 A1 * | 5/2009 | Koo et al. | 726/23 |
| 2010/0102926 A1 * | 4/2010 | Grieve et al. | 340/5.1 |
| 2011/0131013 A1 * | 6/2011 | Lee et al. | 702/188 |
| 2011/0148591 A1 * | 6/2011 | Reynolds et al. | 340/10.2 |
| 2012/0047113 A1 * | 2/2012 | Weinberger et al. | 707/693 |
| 2012/0063436 A1 * | 3/2012 | Thubert et al. | 370/338 |

* cited by examiner

METHOD AND SYSTEM FOR DISCOVERY AND TRANSPARENT STATUS REPORTING FOR SENSOR NETWORKS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to network security systems and, in particular, to a method and system for transparently assessing and reporting the status of wireless nodes in the network security system.

BACKGROUND OF THE INVENTION

Electronic article surveillance ("EAS") systems are used to protect articles from unauthorized removal from a protected area. Such systems typically operate using a sensor affixed to the article being protected. The sensors are arranged such that, when activated, the sensors respond to an interrogation signal in a predictable manner, thereby allowing the interrogating device, e.g., reader, to determine that an active sensor is in the interrogation zone. For example, an interrogation zone may be established near the exit of a store so that articles with activated sensors trigger an alarm when detected by the reader.

EAS systems incorporate a network controller that communicates with each sensor in the network. This communication link between the network controller and the sensors can be either wired or wireless. Often, sensors that normally operate in a wired environment may need to be utilized in a wireless environment. It is desired to utilize these sensors without burdensome or costly changes in design or processing. Sensors and their wireless node functions may be incorporated into one operational unit. Alternately, the sensor is in communication with a wireless node in the network. The wireless node and the sensor communicate and manage the wireless functions. It is beneficial for the network controller to learn the status and overall health of wireless nodes within the network. However, current systems require the sensors themselves to interface with wireless nodes and to determine the relative health and status of each wireless node it is in contact with and report back to the network controller. When a wireless node is connected to or incorporated into a sensor, the sensor is burdened with the task of monitoring and reporting to the network controller the health of the wireless node and its functions.

Other wireless networks operate completely independent of the underlying sensor operation and report their status directly to the network controller. This creates two systems, the wired (or wireless) EAS sensor system, and the wireless network, resulting in an overall inefficient system from a management perspective. Thus, present systems either operate inefficiently under two independent systems, or operate in concert but place the burden of the assessment, management, and reporting of the wireless nodes' status directly on the sensors themselves.

Therefore, what is needed is a system and method for assessing and reporting wireless node health and status to a network controller without burdening or otherwise altering the design of sensor devices within the EAS system.

SUMMARY OF THE INVENTION

The present invention advantageously provides a method and system for providing the health and status of wireless node devices to a network controller in an electronic article surveillance system. This is accomplished by the wireless node devices appending their status information to a sensor device message that is transmitted to the network controller. The wireless node device status information is appended to the sensor device message without the sensor's knowledge. Thus, the health and status of the wireless node devices can be ascertained without that burden being placed on the sensor devices themselves.

In one aspect of the invention, a method of monitoring wireless node devices in an electronic article surveillance ("EAS") system is provided. The method includes polling at least one sensor device for status information. The at least one sensor device is in communication with at least one wireless node device. The method also includes receiving a response message from the at least one wireless node device where the response message contains sensor status information generated by the at least one sensor device and wireless node status information appended to the sensor status information by the at least one wireless node device. The method also includes extracting the wireless node status information from the response message, where the response message includes a frame transmission.

In accordance with another aspect, the present invention provides a wireless node device for use in an EAS system. The wireless node device is in communication with at least one sensor device in which the wireless node device has a wireless transmitter. A receiver is arranged to receive a response message from the at least one sensor device. A processor is in communication with the receiver and the wireless transmitter. The processor operates to append wireless node device status information to the response message received from the at least one sensor device. The processor sends the response message with the appended wireless node device status information to the wireless transmitter.

In accordance with yet another aspect, the present invention provides a method of supplying wireless node device status information from a wireless node device to a network controller in an electronic article surveillance ("EAS') system. Communication is established with at least one sensor device. Wireless node device status information is appended to a response message received from the sensor device. The response message with the appended wireless node device status information is transmitted to the network controller.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
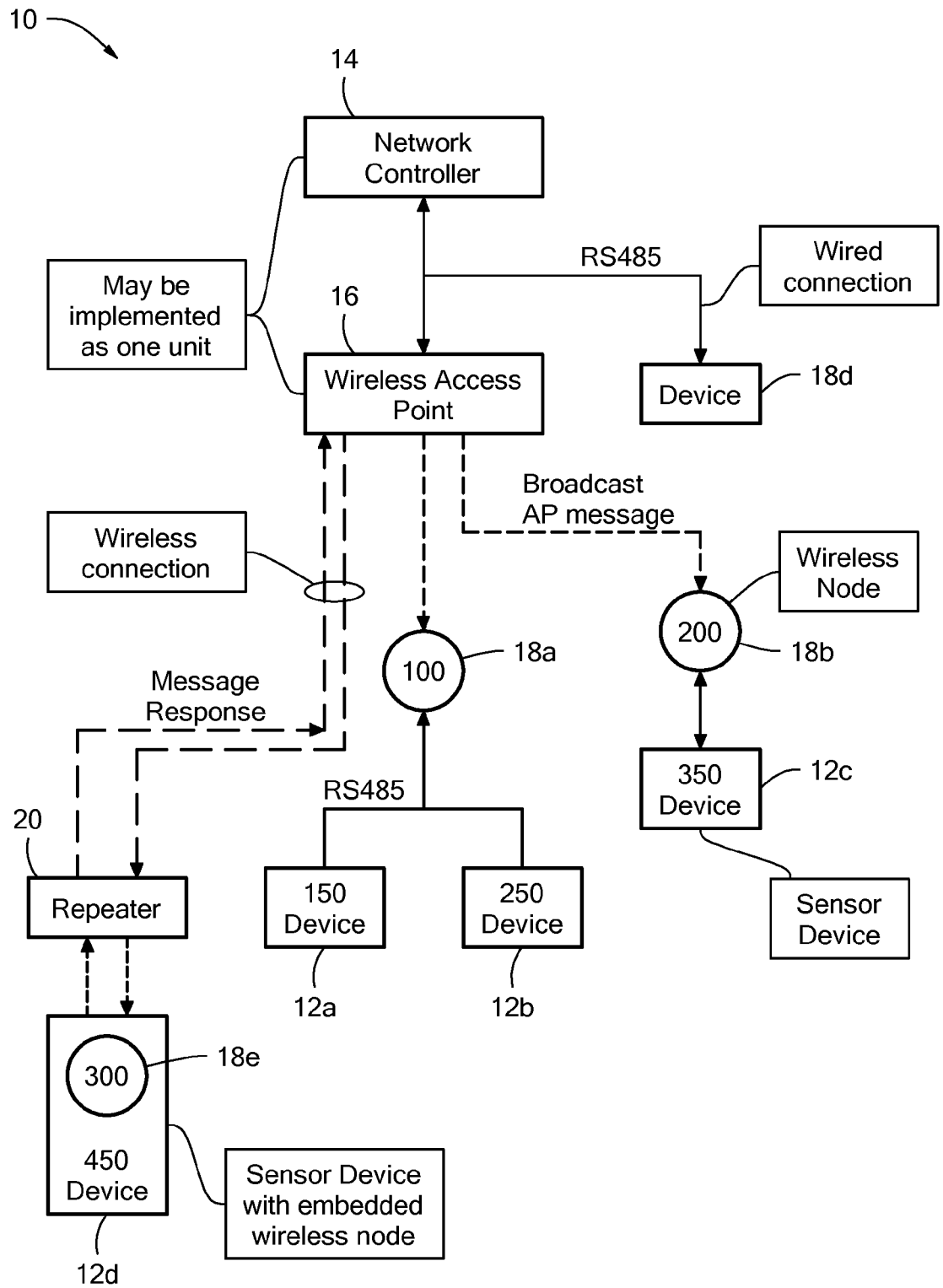
FIG. 1 is a block diagram of system constructed in accordance with the principles of the present invention.

Before describing in detail exemplary embodiments that are in accordance with the present invention, it is noted that the embodiments reside primarily in combinations of apparatus components and processing steps related to implementing a system and method for the transparent reporting of wireless node device status information in a communication network.

Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a system and method for transparently assessing and reporting the status and health of wireless network nodes in an EAS system. The system allows a network controller to obtain status information from a sensor device without the need for the controller to directly address any of the wireless nodes within the network and without the need for the sensor to be redesigned or burdened with the extra responsibility of reporting on the health of wireless nodes. The wireless node is situated between the network controller and the sensor devices' communication interface. The wireless node attaches its status information to a response message transmitted from the sensor device to the network controller in response to a status query. This can be done without altering the structure or design of the sensor device. The network controller extracts the status information of the wireless node from the sensor device's response message. The network controller constructs a table listing addresses for each wireless access node and their corresponding sensor device addresses. In this fashion, the network controller can assess the health of each wireless node in the network either by directing a status command to the nodes' addresses or by processing status information that each wireless node appended to a response message from its corresponding sensor device. The wireless node information that is appended is done so without the knowledge of the sensor thus providing, from the sensor's perspective, a transparent reporting system and method.

Referring now to the drawing figures in which like reference designators refer to like elements, there is shown in FIG. 1 a diagram of a network topology for an expanded star network of an electronic article surveillance ("EAS") communication network 10. Network 10 includes one or more sensor devices 12a-12d (four shown, referenced collectively as "sensor device 12") and a local device manager ("LDM") or network controller 14. Sensor devices 12 may be include any type of sensor such as, for example, a temperature sensor, or an EAS sensor. System 10 may include a wireless access point 16, which manages the network 10 and implements a poll-response protocol method to transfer information. Wireless access point 16 may be separate from network controller 14 or incorporated within network controller 14 as one unit. One or more repeaters 20 are used to extend the range of the wireless access point 16 and to assist in the communication of messages between network controller 14 and sensor devices 12. Messages routed through repeaters 20 (or range extenders) are routed according to a method established for a particular network 10 with the appropriate fields and controls. In the case of a basic repeater 20, all messages detected by repeater 20 are replayed, without altering the message's packet frame, in order to extend the range of network 10. In other instances, repeater information is included in routing tables and control methods are implemented to reduce RF transmissions by repeater 20.

Wireless node device 18a, 18b, and 18c, (three shown, referenced collectively as "wireless node device 18") are also included in the network 10 and are in electronic communication with certain sensor devices 12 as well as network controller 14 via wireless access point 16. It should be noted that network 10 may include any number of wireless access points 16, sensor devices 12 and wireless nodes devices 18. Each wireless node device 18 may include a power source, a transceiver, a micro-controller, external memory, sensors and an analog-to-digital convertor, along with other hardware and software enabling the wireless node device 18 to communicate with sensor devices 12, wireless access point 16, and network controller 14.

In an EAS system, the sensor devices 12 receive polling request signals from controller 14. In one embodiment, sensor device 12 is an electronic transmitter/responder. Sensor device 12 can be a portable or mobile device, such as a hand-held device, or can be a device in a fixed-position/fixed-mount configuration such as a pedestal, depending upon the desired application. Sensor device 12 responds to a transmitted or communicated polling request signal from the controller 14. Sensor device 12, such as an EAS system pedestal, can emit radio waves in an interrogation zone to interrogate tags within the interrogation zone, the zone size varying depending upon the power output and the frequency used. Sensor device 12 can determine the status of an interrogated tag and pass corresponding data to a host computer for processing as part of a response to a polling request signal.

Sensor devices 12 can communicate with network controller 14 either via a wired network connection or wirelessly. Network controller 14 controls the processing of information and the operation of the wireless access point 16. Network controller 14 manages network 10 by collecting, assessing and processing information related to the health and status of the network 10. In the case of a wireless network, network controller 14 ascertains the status and health of the wireless node devices 18 in the network. The present invention provides this information to network controller 14 in a way that is transparent to sensor devices 12.

In one embodiment, sensor devices 12 communicate with network controller 14 via wireless nodes 18. Sensor devices 12 and wireless device nodes 18 communicate with each other within network 10. In one embodiment, a wireless node device 18e is embedded within or included within the same housing as a sensor device 12d. In another embodiment, more than one sensor device, e.g. 12a and 12b, are in communication with a single wireless node device 18a, as shown in FIG. 1. The present invention allows the health and status of each wireless node device 18 to be determined and transmitted to network controller 14 without burdening the sensor device 12 with this task.

The present invention allows wireless node device 18 to communicate its status to network controller 14 by appending, e.g., attaching or embedding, its device address and wireless status to message responses from a sensor device 12 it is in communication with. The information appended is communicated to processing layers beyond the media access and control layer of the wireless access point 16. Because the impacted communication is upstream to the controller 14, sensor devices 12 are unaware that additional status and information is being appended to their message response. Further, the address of a wireless node device 18 can be associated with the address of more than one sensor device address. This association allows network controller 14 to capture the network topology where multiple sensor devices 12 can be physically connected to one wireless node device 18 which services the wired network. By this approach, network controller 14 becomes aware of the presence of each wireless node device 18 in the network as well as learning which sensor device 12 is associated with which wireless node device 18. This allows the network, via network controller 14 to "self-learn" the topology of the network.

Referring to FIG. 1, sensor device 12*a* receives a status request from network controller 14. The response sent to network controller 14 also includes status information related to the health and status of wireless node device 18*a*. Sensor device 12*a* and wireless node device 18*a* are in communication with each other such as, for example, via a wired RS-485 standard connection. Sensor devices 12 receive inquiries from network controller 14 as to its current status. In response, sensor devices 12 may provide information regarding not only its relative health status but other sensor data as well. For example, if sensor device 12 is a pedestal, the pedestal may report if an alarm has occurred. If sensor device 12 is a deactivator, it can report how many deactivations have occurred. Often, network controller 14 wishes to obtain status information from wireless node devices that are associated with sensor device 12*a*. Wireless node device 18*a* appends its address and wireless status information to a response message sent from sensor device 12*a*. Similarly, wireless node device 18*a* can also append its address and wireless status information to a response message sent from sensor device 12*b*. In another example, wireless node device 18*e* is embedded within sensor device 12*d* and appends its wireless address and status within the response message from sensor device 12*d* to network controller 14. As mentioned above, in all cases, each sensor device 12 is unaware that additional status and address information is being appended to its message. Messages exchanged between network controller 14 and sensor devices 12 can be transmitted directly or via repeater 20.

Figure 2:
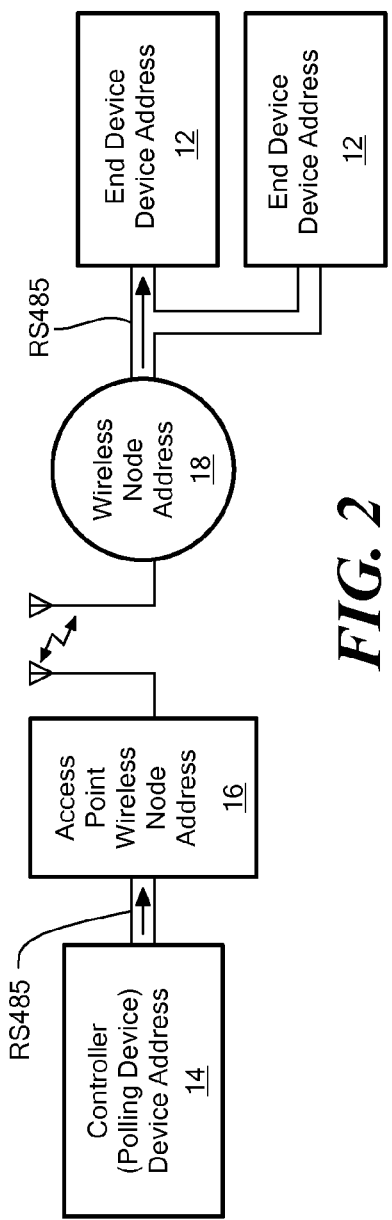
FIG. 2 is a block diagram showing the relationship between wireless node addresses, sensor device addresses and the network controller in accordance with the principles of the present invention.

FIG. 2 is a diagram showing how network controller 14 and wireless access point 16 receive status information from one or more wireless node devices 18 via the dual addressing method described above. As discussed above, wireless node device 18 is in communication with one or more sensor devices 12. Wireless node device 18 appends information including its current status and health as well as its wireless node address in a transmission to sensor device 12. As mentioned above, the address of a wireless node device 18 can be associated with the address of more than one sensor device address. The wireless node device is aware of the status information being transmitted by the sensor device 12 to network controller 14 by decoding the command field of the message that it is being transmitted by sensor device 12 to network controller 14 through the network. Wireless node device 18 appends its status information and updates other fields in the sensor device frame transmission as needed. For example, the size of the sensor device frame may need to be increased to accommodate the added information that is being sent in the transmitted frame.

Upon receipt of sensor device transmissions, network controller 14 builds a table of wireless node device addresses and associated sensor device addresses. This table allows the network controller 14 to directly assess the health of a wireless node by directing a status command to the address of the nodes or by extracting and processing status information that the wireless node device 18 appended to a response message from the sensor device 12.

Figure 3:
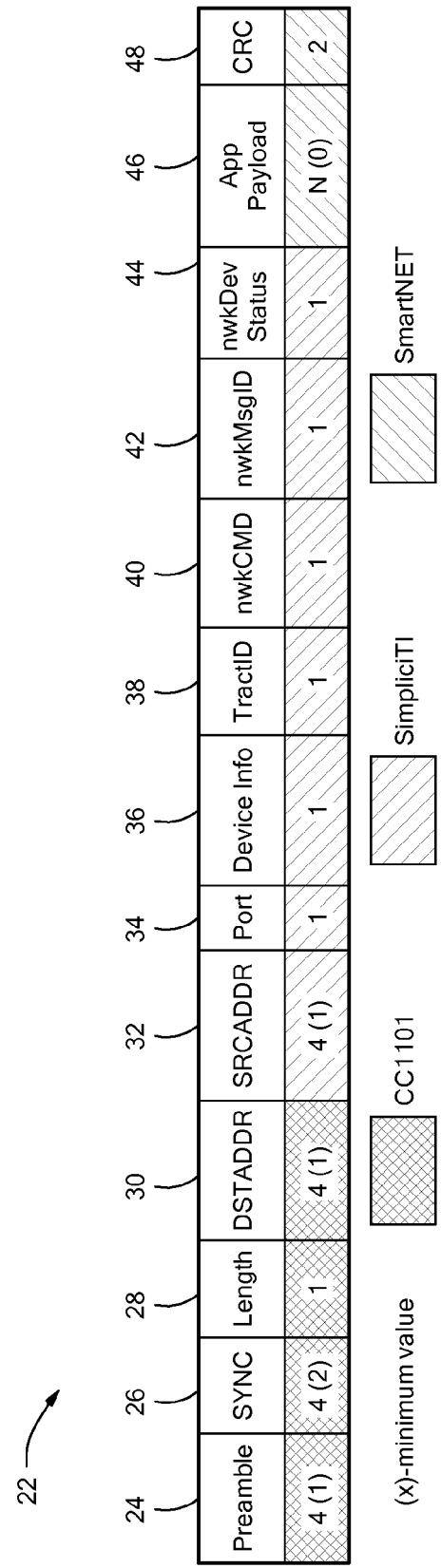
FIG. 3 is a diagram of an exemplary frame structure of a wireless frame transmission incorporating the principles of the present invention.

FIG. 3 is a diagram of an exemplary frame structure 22 showing the fields in an exemplary wireless frame transmission from sensor device 12 to network controller 14. For example, each frame may include a preamble field 24, a SYNC field 26, a length field 28 indicating the length of the transmission and a DSTADDR field 30, which represents the destination address, i.e. the address of the wireless access point 16 or network controller 14 to which the frame is being sent. As discussed above, wireless node 18 appends its address, in this case represented by the SRCADDR field 32, to the transmission. Fields 34, 36, 38, 40, 42 and 44 contain additional information about the wireless node device 18 whose status information is being sought. Fields 46 and 48 contain information about the sensor device 12 that is sending the response message to network controller 14.

Frame structure 22 includes fields containing information introduced by different communication layers. For example, frames 24-30 may be transmitted under a first, e.g., CC1101, communication layer, frames 32-44 under a second, e.g., the SimplicitTI, communication layer, and frames 46 and 48 under a third, e.g., SmartNET, communication layer. The third layer appends the wireless node device 18 status information to frame 22. The nwkDevStatus field 44 may be a fixed field that is always present in a frame transmission, or it can be dynamic and the nwkCMD field 40 determines the presence of the nwkDevStatus field 44. Network controller 14 or wireless access point 16 can determine if a status device response message contains status from a wireless node device 18 in a number of ways. For example, a port field in frame structure 22 may indicate that the port that handles the message includes wireless node device status field processing. Alternately, field 40 can represent a command that indicates when a wireless node status message is appended to frame 22.

Figure 4:
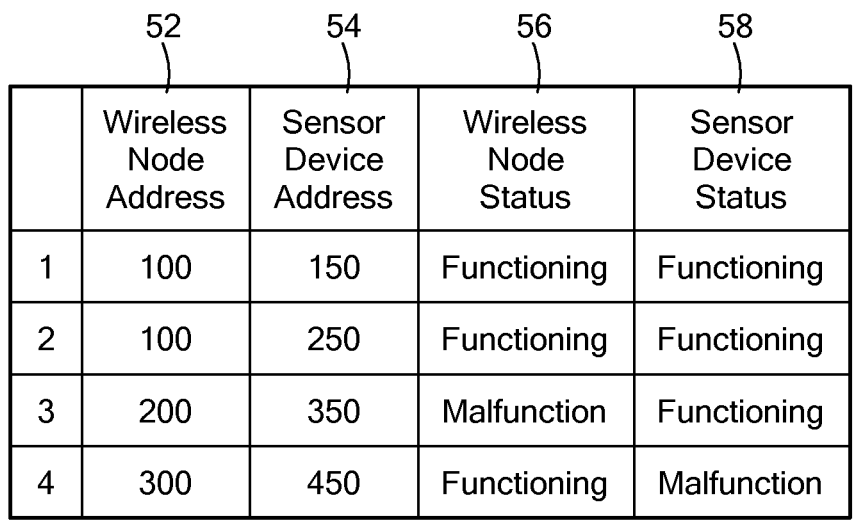
FIG. 4 is a table of exemplary wireless node addresses and associated sensor device addresses constructed in accordance with the principles of the present invention.

FIG. 4 illustrates a device status table 50 created by network controller 14 or wireless access point 16 when it processes status information obtained when the wireless node device 18 appends its information to a response message from the sensor device 12. Network controller 14 creates and populates a table of wireless node device addresses and associated host sensor device addresses. This table 50 allows the network controller 14 to directly assess the health of a wireless node device 18 by directing a status command to the nodes' address. Network controllers 14 or wireless access points 16 maintain tables of node health which can be associated to a router table (link path) for managing the network. The wireless access point tables are used in directing the operation of wireless network node devices 18.

The table shown in FIG. 4 includes a listing of wireless node devices addresses 52 and their corresponding sensor device addresses 54. The status of each wireless node device 18 and sensor device 12 is also listed in columns 56 and 58 respectively. In order to populate table 50, network controller 14 polls each sensor device 12 in the network and awaits a response. Each sensor device 12 responds to network controller 14 with a message that includes its own address and status and the address and status of each wireless node device 18 that is in communication with the polled sensor device 12.

Thus, referring to the network topology illustration in FIG. 1 and table 50 of FIG. 4, sensor devices 12a and 12b addresses are assigned sensor device addresses 10 and 20 respectively. Both sensor devices 12a and 12b are associated with a single wireless node device 18a, which is assigned a wireless node address of (100). Thus, the table in FIG. 4 shows that sensor devices having addresses of (150) and (250) are associated with a wireless node device having a wireless node address of (100). From the table it can be seen that the wireless node device 18a associated with the listed wireless node address (100) and the sensor devices 12a and 12b associated with the sensor device addresses (150) and (200) are all functioning properly. On the other hand, the sensor device associated with sensor device address (450) and the wireless node device associated with wireless node address (200) are not working properly. Network controller 14 uses table 50 to directly assess the health of any wireless node device 18 in the network by directing a status command to the nodes' address or to the address of the sensor device 12 to which the wireless node device 18 is associated.

Figure 5:
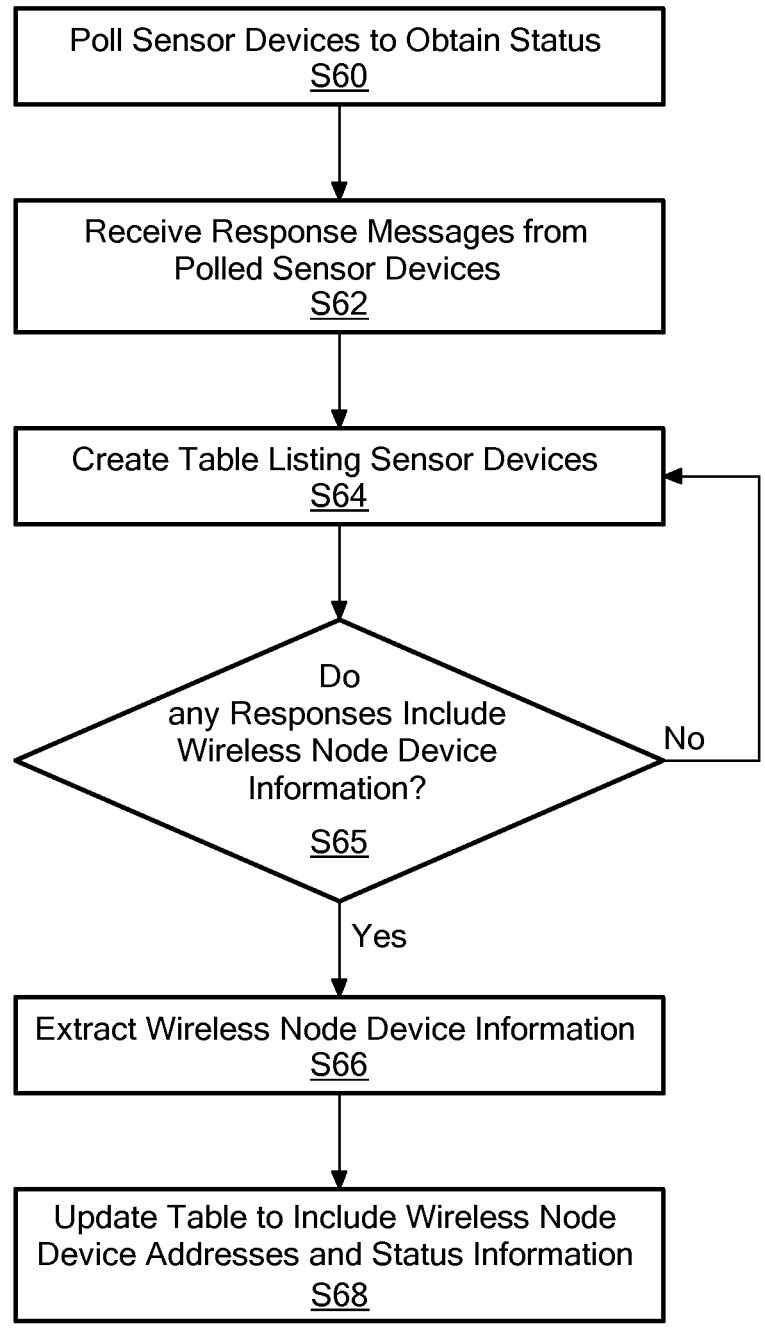
FIG. 5 is a flowchart of an exemplary process performed by a network controller according to the principles of the present invention.

FIG. 5 is a flowchart illustrating the steps taken by the network controller 14 in order to assess the health and status of wireless node devices 18 within the network. Network controller, via wireless access point 16, transmits a status inquiry to the sensor devices 12 in the network that it wishes to obtain status information from (step S60). Network controller 14, via wireless access point 16, receives responses messages from the polled sensor devices 12 (step S62). Network controller 14 creates table 50 (step S64) that lists each responsive sensor device 12 in the network, its corresponding device address, and information regarding its status, i.e., signal strength, noise level, functioning/not-functioning status, etc. If, at step S65, network controller 14 determines that the sensor device responses include wireless node device status information, network controller 14 extracts the wireless node device information (step S66), and updates table 50 to include wireless node device status information including the address of the wireless node device 18 (step S68). In an alternate embodiment, wireless access point 16 determines that the sensor device response includes wireless node device status information, extracts the wireless node device information and updates table 50, which could be maintained either by network controller 14 or wireless access point 16. Thus, either network controller 14 or wireless access point 16 can perform these functions and maintain table 50.

Once table 50 is created, network controller 14 can determine which sensor devices 12 have associated wireless node devices 18. Network controller 14 can determine the health and status of a wireless node device 18 in the network in two ways by referring to table 50. If no sensor device 12 is associated with the wireless node device 18, or there is no received response message from the polled sensor device 12, network controller 14 can direct a status request directly to the address of the associated wireless node 18. If there is a sensor device 12 address associated with the address of the wireless node device 18, then network controller 14 can direct a status request to the sensor device 12 and receive appended wireless node device status information in the transmission frame of the response message from sensor device 12. Network controller 14 extracts the appended information, determines the status of the wireless node device 18, and updates table 50 accordingly. When the wireless node device information is appended to the sensor device response message, sensor device 12 is unaware of the appended information, thus reducing the processing and memory burden on the sensor device 12.

The present invention provides a system and method which enables a network controller 14 to communicate with one or more wireless node devices 18 by either sending status requests directly to the wireless node device 18 or by receiving response messages from polled sensor devices 12, where the sensor device's response message includes address and status information from a wireless node device 18 that is in communication with the polled sensor device. Wireless node device 18 appends its status information to the sensor device transmission frame from the sensor device 12 and, if necessary, updates other fields in the transmission frame. Thus, there is no additional processing or memory burden on the sensor device 12 to seek out status information from the wireless node device. Sensor device 12 simply responds to the network controller 14 which now has appended status and address information attached to the frame transmission.

The present invention can be realized in hardware, software, or a combination of hardware and software. Any kind of computing system, or other apparatus adapted for carrying out the methods described herein, is suited to perform the functions described herein.

A typical combination of hardware and software could be a computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method of monitoring wireless node devices in an electronic article surveillance ("EAS") system, the method comprising:

polling at least one sensor device in communication with at least one wireless node device for status information, the polling configured to cause the at least one sensor device to transmit a response message having a transmission frame structure including a plurality of fields corresponding to a first communication layer and a second communication layer different from the first communication layer, the response message including sensor status information generated by the at least one sensor node;

receiving a modified response message, the modified response message containing at least one additional field embedded within the plurality of fields of the response message, the at least one additional field including wireless node status information and corresponding to a third communication layer different from the first and second communication layers; and extracting the wireless node status information from the modified response message.

2. The method of claim 1, further comprising populating a routing table with wireless node device addresses and sensor device addresses associated with a corresponding wireless node device.

3. The method of claim 2, wherein the routing table includes the current status of each sensor device and the current status of each associated wireless node device.

4. The method of claim 2, further comprising assessing the status of a wireless node device by directing a status command directly to the wireless node device.

5. The method of claim 2, wherein the address of a wireless node device is associated with addresses of more than one sensor device.

6. A wireless node device in an electronic article surveillance ("EAS") system, the wireless node device being in communication with at least one sensor device, the wireless node device comprising:

a wireless transmitter;

a receiver configured to receive a response message from the at least one sensor device, the response message having a transmission frame structure including a plurality of fields corresponding to a first communication layer and a second communication layer different from the first communication layer; and a processor in communication with the receiver and the wireless transmitter, the processor configured to:

embed at least one additional field within the plurality of fields of the response message, the at least one additional field including wireless node device status information and corresponding to a third communication layer different from the first and second communication layers; and send the response message with the embedded wireless node device status information to the wireless transmitter.

7. The device of claim 6, wherein the processor determines when a status response message is being transmitted by the at least one sensor device.

8. The device of claim 7, wherein the processor determines when a status response message is being transmitted by the at least one sensor device by decoding a command field of the response message.

9. The device of claim 6, wherein the response message with the embedded wireless node device status information includes the transmission frame structure of the response message received from the at least one sensor device, the at least one additional field and plurality of fields configured to contain information introduced by different communication layers of the EAS system.

10. The device of claim 6, wherein the receiver further receives status inquiries from a network controller.

11. A method of supplying wireless node device status information from a wireless node device to a network controller in an electronic article surveillance ("EAS') system, the method comprising:

establishing communication with at least one sensor device;

receiving a response message from the sensor device, the response message having a transmission frame structure including a plurality of fields corresponding to a first communication layer and a second communication layer different from the first communication layer;

embedding at least one additional field within the plurality of fields of the transmission frame structure of the response message received from the sensor device, the at least one additional field including wireless node device status information and corresponding to a third communication layer different from the first and second communication layers; and transmitting the response message with the embedded wireless node device status information to the network controller.

12. The method of claim 11, further comprising determining when the at least one sensor device transmits the response message.

13. The method of claim 12, wherein determining when the at least one sensor device transmits the response message includes decoding a command field of the response message.

14. The method of claim 11, wherein the transmission frame structure of the response message received from the sensor device includes a preamble, the preamble remaining unmodified after the embedding of wireless node device status information.

15. The method of claim 11, wherein embedding wireless node status information within the transmission frame structure includes increasing the amount of fields of the transmission frame.

16. The method of claim 11, wherein the wireless node device and the at least one sensor device are housed in a single unit.

17. The method of claim 11, wherein the wireless node device status information includes an address of the wireless node device.

18. The method of claim 17, wherein the address of the wireless node device is associated with an address of more than one sensor device.

19. The device of claim 6, wherein the transmission frame structure of the response message received from the at least one sensor device includes a preamble, the preamble remaining unmodified after the embedding of wireless node device status information.

* * * * *